United States Patent Office
3,447,997
Patented June 3, 1969

3,447,997
WEATHERABLE HIGH IMPACT
RESISTANT LAMINATES
Musa Rasim Kamal, Hamden, Conn., assignor to Formica Corp., Cincinnati, Ohio, a corporation of Delaware
No Drawing. Filed Nov. 30, 1965, Ser. No. 510,673
Int. Cl. B32b 27/06
U.S. Cl. 161—165                                    6 Claims

ABSTRACT OF THE DISCLOSURE

A high impact strength, weatherable, mar and craze resistant unitary, heat and pressure consolidated laminated article comprising (1) a thermoplastic polymer substrate, having a thickness of from 1/16 inch to about 1/2 inch, selected from the group consisting of polymers of vinyl chloride, styrene, an acrylate ester and a methacrylate ester, (2) an exterior layer, having a thickness ranging from about 5 to about 20 mils of a mixture of polymethylmethacrylate and from about 10% to about 20%, by weight, based on the total weight of the mixture, of polytetrafluoroethylene.

---

This invention relates to laminated articles for outdoor use and to a method for the production thereof. More particularly, this invention relates to novel high impact, weatherable, mar-resistant and craze-resistant thermoplastic laminated articles comprising (1) a substrate of a polymer of vinyl chloride, styrene or an acrylic ester or methacrylic ester alone or in combination with an elastomeric material and an overlay sheet of a mixture of (2) polymethylmethacrylate and from about 10% to about 20% by weight, based on the weight of said polymer, of polytetrafluoroethylene.

A search for laminated articles for outdoor use has been actively carried out for a long period of time. The prior art is replete with patents directed to laminated articles adapted for outdoor use and recognizes the properties necessary in order to produce such structures. It is known that laminated articles for outdoor use should be weatherable, i.e., resistant to moisture, dryness, cold and heat and still maintain the superior structural attributes and excellent appearance exhibited by laminated articles designed for interior use. Such structural and decorative properties include, high impact strengths and resistance to marring and crazing.

Polymethyl methacrylate, in sheet form, has many attractive properties such as mar-resistance, craze-resistance and weatherability and, as such, has been proposed for use in outdoor structures. The polymers thereof, however, have relatively poor impact strengths and, as such, are prone to cracking and breakage upon rather unsubstantial contact with other materials.

I have now found that outdoor laminates can be produced utilizing the advantage of the structural and decorative appearance of, for example, polymethyl methacrylate and the impact strength of polytetrafluoroethylene. The laminates produced, therefrom, have high impact strengths and are weatherable, mar-resistant and craze-resistant.

It is, therefore, an object of the present invention to provide laminated articles for outdoor use and a method for the production thereof.

It is a further object of the present invention to provide novel, high impact strength, weatherable, mar-resistant and craze-resistant outdoor laminates composed of a substrate of a polymer of vinyl chloride, styrene, an acrylic or methacrylic ester or a mixture of a polymethylmethacrylate and an elastomer and an overlay sheet comprising a mixture of polymethylmethacrylate and polytetrafluoroethylene.

These and other objects will become more apparent to one skilled in the art upon reading the more detailed description of the present invention set forth hereinbelow.

As mentioned above, the substrate or core layer of the outdoor laminates of the present invention are composed of polymers of vinyl chloride, styrene, an acrylate or a methacrylic ester and mixtures of polymethylmethacrylate and an elastomer. The substrate should have a thickness of between about 1/16 inch and 1/2 inch, inclusive, preferably from about 1/8 inch to about 3/8 inch, inclusive. The substrate can be used in the form of an extruded sheet or may be an article produced by any known casting procedure. Additionally, one may utilize a core member which has been calendered, i.e., treated with pressurized rollers so as to impart a glazed surface thereto.

The exterior or overlay sheet of the laminates of the present invention must be produced from a mixture of polytetrafluoroethylene and polymethylmethacrylate. The overlay sheet should have a thickness of between about 5 mils and 20 mils, preferably 8–15 mils, and should contain from about 10% to about 20%, by weight, based on the weight of the polymer with which it is admixed, of polytetrafluoroethylene. The exterior layer may be utilized in the form of a preformed extruded sheet, a film or the like.

According to the instant invention, the overlay sheet can be bonded to the substrate without benefit of any extraneous adhesive material by the application of heat and pressure to form a bond which will not delaminate even after prolonged exposure to the extremes of temperature and humidity.

The thermoplastic substrate materials mentioned above can be produced in any way and in general, the vinyl chloride, styrene, acrylate and methacrylate polymers should have as high an impact strength and flexural strength as possible in order to obtain products having optimum properties.

The acrylate and methacrylate polymers contemplated for use in the present invention are those having the formula:

(I)      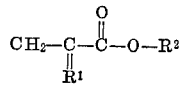

wherein $R^1$ is hydrogen or a methyl radical and $R^2$ is an alkyl radical having from 1 to 6 carbon atoms, inclusive. Compounds which are represented by Formula I and consequently, may be used as monomers, alone or in admixture with one another, from which the polymers used in the process of the present invention may be produced include methyl acrylate, ethyl acrylate, n-propyl acrylate, isopropyl acrylate, n-butyl acrylate, isobutyl acrylate, t-butyl acrylate, n-amyl acrylate, isoamyl acrylate, t-amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, t-amyl methacrylate, hexyl methacrylate and the like.

The acrylate and methacrylate polymers can be utilized as pure homopolymers of the monomers involved or as copolymers thereof, with not more than 30%, by weight, of monoethylenically unsaturated monomer copolymerizable therewith. Examples of such comonomers include styrene, acrylonitrile, acrylamide, ethyl acrylate, and the like.

Likewise, the styrene and vinyl chloride can be utilized as homopolymers or copolymers thereof with up to 15% of any monomer which is copolymerizable therewith such as vinyl acetate, vinylidene chloride and the like.

The polytetrafluoroethylene resin which may be employed in the practice of the present invention may be bonded with the polymer in the form of a latex, dispersion, or emulsion thereof, in such materials as water, mineral oil or benzene or in the form of a powder. The polytetrafluoroethylene and polymethylmethacrylate with which it is to be admixed are generally blended by subjecting them to the shearing action of any commercially available mixing apparatus such as a ball mill, a rubber mill, an extruder, a Banbury mixer or the like. When the polytetrafluoroethylene (hereafter sometimes referred to as PTFE) and polymethylmethacrylate are subjected to the shearing action of the mixing apparatus, the particles of PTFE tend to become fibrous in consistency and, upon examination of the final composition with an electron microscope, the PTFE can be seen to be present in the form of finely divided micro-fibrous and supermicrofibrous particles having diameters ranging from about 100 angstroms to about 2 microns. The particle size of the PTFE mixed with the polymethylmethacrylate is not critical, however, it is preferred that particle sizes ranging from about 0.1 micron to about 0.5 micron be employed. When latices or emulsions of the PTFE are blended with the polymethylmethacrylate, the solvent present therein can be removed during or after the blending operation without detracting from the properties achieved in the final laminated article.

There is, also employed in one aspect of this invention, a polymethylmethacrylate-elastomer composition.

This composition of an ester of methacrylic acid, i.e., polymethylmethacrylate preferably, and a rubber is generally known in the art and its preparation is set forth more particularly in Canadian Patents 628,148, 643,619 and recent Schmitt et al. Canadian Patent No. 713,635, all of which patents are incorporated by reference herein.

A preferred composition of such material which has been found to exhibit a suitable utility in the present laminate structure is composed of a resinous terpolymer containing from about 50 to about 85% of methyl methacrylate, from about 5 to about 40% of styrene and from about 1 to about 30%, all by weight, of acrylonitrile modified with from about 5 to 25% by weight, of a poly(butadiene) which has been grafted by the polymerization, in the presence of said poly(butadiene) of at least 10%, by weight, of at least one, and preferably all, of the monomers in said terpolymer. All the weight percentages have the same basis as indicated above. These polymer-rubber compositions may be prepared by well-known technique such as those methods disclosed in the above cited Canadian patents.

The most widely practiced method of preparation comprises forming the impact polymer by polymerizing a mixture of the monomers, in their respective concentrations in the presence of a free radical polymerization catalyst and the rubbery polymer at a temperature ranging from about 60° C. to about 230° C. Solvent, bulk or emulsion polymerization systems may be utilized. Catalysts, such as benzoyl peroxide, di(t-butyl)peroxide, 2,5-dimethyl-2,3-di(t-butylperoxy)hexane and the like, at concentrations ranging from 0.001 to 1.0%, by weight, based on the weight of the monomers may be used. In this manner, the polymer per se is formed and the rubbery material is grafted thereon.

The laminated articles of the present invention must be composed of at least two layers, i.e., the substrate or core layer and the exterior or overlay sheet. It is possible, however, to also utilize laminates composed of three layers wherein the core sheet is sandwiched between two overlay sheets composed of a mixture of PTFE and a polymethylmethacrylate.

The laminates of the present invention can be prepared by a batch or continuous process. In a batch process, the various layers in the assembly are inserted into a press and heated under pressure for such a period of time as to reach the fusion point of the thermoplastic resin, whereupon the heat and pressure are reduced, and upon cooling of the consolidated assembly, the laminate can be removed from the press in a state ready for any further processing necessary to produce a formed commerical product.

In a continuous operation, the various components may be extruded in the desired superimposed relation and brought together through rotating heated rolls for a period of time and at a temperature sufficient to achieve the fusion of the components into a unitary structure. The structure is then placed through cooling rollers so as to emerge in a state ready for any further processing necessary to produce a formed commercial product.

The molecular weights of the individual polymers involved is not critical in the laminated structure of the present invention and may be varied over a substantial range without detracting from the enhanced properties of the products of the present invention. Polymers having the highest molecular weights are, however, preferred.

The procedure by which the overlay sheets of the mixture of PTFE and polymethylmethacrylate polymer are fabricated and compacted with the core sheet of thermoplastic polymer is similar to those conventionally practiced in the laminated art. One approach is to preform sheets of each material to the required thickness, assemble the resultant number of sheets into the required number of plies and then heat and pressure consolidate the layers in a suitable laminating press. A second approach may comprise extruding the polymer materials through a flat die of the required thickness and then compacting the sheets in a suitable laminating press. In place of extrusion, any technique may be utilized, for example, spray drying or dipping followed by removal of the excess resin by scrapers, squeeze rolls, air blades or the like. Fluidized bed coating techniques may also be employed.

In practicing such processes, temperatures ranging from about 135° C. to about 190° C., inclusive, and preferably from about 150° C. to about 180° C., inclusive, may be used. The amount of pressure will generally vary inversely with the temperature and may be varied from about 50 p.s.i. to about 1500 p.s.i. and preferably, from about 75 p.s.i. to about 200 p.s.i. The time required to convert the separate laminae into a unitary, consolidated structure will depend upon the temperature and pressure of the particular operation employed.

Generally, however, from a few seconds to about 25 minutes should be sufficient to reach the fusion point of the highest softening point of any member of the assembly. After consolidation and fusion have been achieved, the resultant laminate is then immediately cooled to a temperature less than about 50° C., and preferably to room temperature, before being removed from the press. When a decorative laminate is desired, the selected design and/or message to be exhibited may be engraved on the interior surface of the overlay layer, of the laminate structure. Additionally, the core or substrate can be colored and contrasted with the overlay sheet thereby producing laminates useful for such applications as signs, e.g., traffic signs, store signs, advertising signs and the like, license plates, external wall coverings and the like or they may be further processed by heat and pressure so as to convert them into any particular contoured configuration desired.

The polymers employed in the present invention and/or the laminated structure per se, may contain various other materials in trace or minor amounts, such as pigments, dyes, binders, ultraviolet light absorbers, stabilizers, lubricants and the like without detracting from the novel properties of the final structure disclosed hereinabove.

The following examples are set forth for purposes of illustration only and are not to be construed as limitations of the present invention except as set forth in the appended claims. All parts and percentages are by weight unless otherwise indicated.

EXAMPLE 1

A sheet of clear poly(methyl methacrylate), having a thickness of about ½ inch, is placed on a polished stainless steel press plate. Superimposed on the poly(methyl methacrylate) sheet is a 20 mil thick sheet of a 20/80 polytetrafluoroethylene-poly(methyl methacrylate) mixture. A second polished press plate is placed upon the polytetrafluoroethylene polymethylmethacrylate layer and the laminate assembly is heat and pressure consolidated at 100 p.s.i. until a maximum temperature of 160° C. is attained. After reaching this temperature, i.e., approximately 10 minutes, the resulting laminate is cooled immediately to room temperature and removed from the press. The laminate thickness is one-half inch.

EXAMPLE 2

A base sheet of a resinous blend of 80% polymethylmethacrylate, 15% polybutadiene and 5% acrylonitrile having a thickness of about ½ inch is placed on a polished stainless steel press plate. Superimposed on the base sheet is a 20 ml thick sheet of a 10/90 polytetrafluoroethylene-poly(methyl methacrylate) blend of polymers. A second polished press plate is placed upon the polytetrafluoroethylene polymethylmethacrylate layer and the laminate assembly is heat-and-pressure consolidated at 800 p.s.i. and a temperature of 150° C. After about 10 minutes as in the preceding example, the resulting laminate is cooled immediately to room temperature and removed from the press. The laminate was firmly bonded together and was resistant to impact as well as being quite weatherable.

EXAMPLE 3

In a fashion similar to the preceding examples, a 1/16" sheet of rigid polyvinylchloride was substituted for the base or core material in place of the polymethylmethacrylate, and blend of the same with rubber, as seen in the preceding examples. The laminating conditions were 25 minutes in the press at 150° C. and 200-300 p.s.i. Cooling was applied for 5 minutes after removal from the press. The laminate structure, thus produced, has an excellent bond between the blend of polymethylmethacrylate and polytetrafluoroethylene acting as an overlay film and the base of polyvinylchloride.

The impact resistance as well as weather resistance of these articles is excellent.

I claim:

1. A high impact strength, weatherable, mar and craze resistant unitary, heat and pressure consolidated laminated article comprising (1) a thermoplastic polymer substrate, having a thickness of from 1/16 inch to about ½ inch, selected from the group consisting of polymers of vinyl chloride, styrene, an acrylate ester and a methacrylate ester, (2) an exterior layer, having a thickness ranging from about 5 to about 20 mils of a mixture of polymethylmethacrylate and from about 10% to about 20%, by weight, based on the total weight of the mixture, of polytetrafluoroethylene.

2. A laminated article according to claim 1, wherein the thermoplastic polymer substrate (1) is poly(methyl methacrylate).

3. A laminated article according to claim 1, wherein the thermoplastic polymer substrate (1) is polystyrene.

4. A laminated article according to claim 1, wherein the thermoplastic polymer substrate (1) is polyvinyl chloride.

5. A laminated article according to claim 1, wherein the thermoplastic polymer substrate (1) is polymethylmethacrylate onto which polymer is grafted an elastomer.

6. A laminated article according to claim 5, wherein the elastomer is a rubber.

References Cited

UNITED STATES PATENTS

| | | | |
|---|---|---|---|
| 3,345,248 | 10/1967 | Pounds et al. | 161—248 |
| 3,356,560 | 12/1967 | Callum | 161—253 X |
| 3,379,606 | 4/1968 | Bratton et al. | 161—189 |

HAROLD ANSHER, *Primary Examiner.*

U.S. Cl. X.R.

156—306; 161—189, 247, 254

UNITED STATES PATENT OFFICE
CERTIFICATE OF CORRECTION

Patent No. 3,447,997                                                June 3, 1969

Musa Rasim Kamal

It is certified that error appears in the above identified patent and that said Letters Patent are hereby corrected as shown below:

Column 2, lines 43 to 45, the formula should appear as shown below:

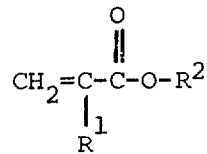

Column 3, line 3, "bonded" should read -- blended --. Column 5, line 12, "160°" should read -- 165° --.

Signed and sealed this 21st day of April 1970.

(SEAL)

Attest:

Edward M. Fletcher, Jr.                                WILLIAM E. SCHUYLER, JR.

Attesting Officer                                                  Commissioner of Patents